US008997293B2

(12) United States Patent
Pichon et al.

(10) Patent No.: US 8,997,293 B2
(45) Date of Patent: Apr. 7, 2015

(54) APPARATUS FOR CLEANING A SUBMERGED SURFACE WITH A DISCONNECTABLE DIRTY CIRCUIT

(71) Applicant: Zodiac Pool Care Europe, Paris (FR)

(72) Inventors: Philippe Pichon, Villeneuve de Riviere (FR); Emmanuel Mastio, Fourquevaux (FR)

(73) Assignee: Zodiac Pool Care Europe, Paris (FR)

( * ) Notice: Subject to any disclaimer, the term of this patent is extended or adjusted under 35 U.S.C. 154(b) by 0 days.

(21) Appl. No.: 14/089,782

(22) Filed: Nov. 26, 2013

(65) Prior Publication Data

US 2014/0076791 A1  Mar. 20, 2014

Related U.S. Application Data

(63) Continuation of application No. 12/808,800, filed as application No. PCT/FR2008/052375 on Dec. 18, 2008, now Pat. No. 8,615,836.

(30) Foreign Application Priority Data

Dec. 21, 2007 (FR) ..................................... 07 09002

(51) Int. Cl.
 *E04H 4/16* (2006.01)
(52) U.S. Cl.
 CPC ..................................... *E04H 4/1654* (2013.01)
(58) Field of Classification Search
 USPC .......................................................... 15/1.7
 See application file for complete search history.

(56) References Cited

U.S. PATENT DOCUMENTS

| 3,676,884 | A | 7/1972 | Wulc |
| 5,245,723 | A | 9/1993 | Sommer |
| 6,013,178 | A | 1/2000 | Strano et al. |
| 6,409,916 | B1 | 6/2002 | Zelas et al. |
| 6,601,255 | B1 | 8/2003 | van der Meyden |
| 7,908,697 | B2 | 3/2011 | Lavabre et al. |

(Continued)

FOREIGN PATENT DOCUMENTS

| EP | 989255 | | 3/2000 |
| EP | 1 916 359 | * | 4/2008 |

(Continued)

OTHER PUBLICATIONS

International Search Report and Written Opinion in Application No. PCT/FR2008/052375 (2009).

(Continued)

*Primary Examiner* — Randall Chin
(74) *Attorney, Agent, or Firm* — Dean W. Russell, Esq.; Kilpatrick, Townsend & Stockton LLP

(57) ABSTRACT

The invention relates to a device for cleaning an immersed surface including a body and members for driving the body over the immersed surface; a filtration chamber which is provided in the body and which has: a liquid inlet; a liquid outlet; a hydraulic circuit for the flow of liquid between the inlet and the outlet through a filtering device, wherein the filtering device includes a filtering casing which is removably mounted in the filtration chamber and which can be inserted into and removed from the filtration chamber in one piece, and the filtering casing has at least a lower end which opens at the base of the body and which constitutes a liquid inlet into the body of the device.

9 Claims, 10 Drawing Sheets

(56) References Cited

U.S. PATENT DOCUMENTS

| | | |
|---|---|---|
| 8,615,836 B2 | 12/2013 | Pichon et al. |
| 2002/0104790 A1 | 8/2002 | Lincke |
| 2004/0074524 A1 | 4/2004 | Horvath et al. |
| 2007/0251032 A1 | 11/2007 | Pichon et al. |
| 2008/0244842 A1 | 10/2008 | Lavabre et al. |
| 2011/0000032 A1 | 1/2011 | Pichon et al. |

FOREIGN PATENT DOCUMENTS

| | | |
|---|---|---|
| FR | 2869058 | 10/2005 |
| FR | 2870281 A1 | 11/2005 |
| JP | H6-225847 A | 8/1994 |
| WO | 2009081064 A2 | 7/2009 |

OTHER PUBLICATIONS

Office Action dated Nov. 17, 2012 in U.S. Appl. No. 12/808,800.
Notice of Allowance dated May 1, 2013 in U.S. Appl. No. 12/808,800.
Notice of Allowance dated Aug. 28, 2013 in U.S. Appl. No. 12/808,800.

* cited by examiner

APPARATUS FOR CLEANING A SUBMERGED SURFACE WITH A DISCONNECTABLE DIRTY CIRCUIT

CROSS REFERENCE TO RELATED APPLICATIONS

This application is a continuation of U.S. patent application Ser. No. 12/808,800 filed on Sep. 20, 2010, now U.S. Pat. No. 8,615,836, which is the U.S. national phase of International Application No. PCT/FR2008/052375 filed on Dec. 18, 2008 and published on Jul. 2, 2009 as International Publication No. WO 2009/081064 A2, which application claims priority to French Patent Application No. 0709002 filed on Dec. 21, 2007, the entire contents of all of which are incorporated herein by reference.

FIELD OF THE INVENTION

The invention relates to a device for cleaning a surface which is immersed in a liquid, in particular a swimming pool surface.

BACKGROUND OF THE INVENTION

A number of known swimming pool cleaning devices comprise:
- a hollow body and members for guiding and driving the body over the immersed surface in a main direction of advance, called the longitudinal direction,
- a filtration chamber which is provided in the hollow body and which has:
- at least one liquid inlet into the hollow body located at the base of the hollow body,
- at least one liquid outlet out of the hollow body,
- a hydraulic circuit which is capable of providing a flow of liquid between each inlet and each outlet through a filtering device which is mounted in the filtration chamber, under the action of a pumping device.

In these known devices, a flap for access to the filtering device must be provided in order to allow it to be removed for the purpose of cleaning it. In prior devices (U.S. Pat. No. 6,013,178), the flap for access to the filtration device is generally located at the base of the hollow body, the liquid inlets being necessarily provided with non-return devices, such as valves. This arrangement is not convenient for the user who must invert the device beforehand which may damage it and also bring about undesirable untimely occurrences of flow. Otherwise, if the access flap is arranged at the top of the device, the hydraulic circuit must have a particularly complex path (cf., for example, U.S. Pat. No. 6,409,916) which requires the use of high-power pumping devices, thus bringing about significant energy consumption.

Furthermore, in all of the known devices, the unclean circuit, that is to say, the portion of the hydraulic circuit of the device which conveys the liquid which has not yet been filtered by the filtering device and which may comprise debris, is not readily accessible for the user. In particular, in some devices (U.S. Pat. No. 6,409,916), access to this unclean circuit may require that the device be disassembled which can be carried out only by a specialist technician in particular so as not to invalidate any manufacturers warranty for the device. In other devices, the access to this unclean circuit also requires the device be inverted.
As a result, the unclean circuits of the known devices are practically never completely cleaned. Consequently, these devices do not have filtration performance levels which are stable over time, in particular when surfaces which are heavily clogged with debris are cleaned. Furthermore, the service periods of the device between which a cleaning operation must be carried out are relatively short if the surface is very clogged with debris and in particular very variable depending on the type of waste recovered with the result that they vary randomly for the user. For example, if the pool is clean but the device draws in a single large leaf, this leaf is capable of substantially blocking the filtering device, making it necessary to clean the filtering device. In this manner, the filtration and suction performance levels of these known devices may decrease rapidly in a random manner from the viewpoint of the user and when the quantity of debris recovered is very much lower than the quantity corresponding to the capacity of the filtering device. However, the performance levels of the device, regardless of the frequency with which the filtering device is cleaned, are never equivalent to the initial cleaning performance levels, since the unclean circuit of the device is never completely cleaned.

Furthermore, the operations for removing and cleaning the filtering devices are unclean, unpleasant and may make the device and/or the user and/or the swimming pool dirty.

SUMMARY OF THE INVENTION

In this context, an object of the invention is to provide a device for cleaning an immersed surface which allows easy cleaning of all of the hydraulic circuit which receives liquid which may contain debris.

An object of the invention is also to provide a device for cleaning an immersed surface whose levels of filtration performance are stable over time, regardless of the nature of the debris, including when cleaning an immersed surface which is heavily clogged with debris, in particular large debris which is larger than a 2 Euro coin.

An object of the invention is also to provide such a device which may have an access flap located at the top, but with a filtration device which has a large storage volume for debris and a simple hydraulic circuit.

An object of the invention is also to provide, for cleaning an immersed surface, a device whose performance/cost ratio is greatly improved relative to that of prior devices. More specifically, an object of the invention is to provide such a device whose cost can be substantially reduced, with performance levels which are equivalent to or even greater than those of known devices.

An object of the invention is also to provide such a device which has no movable non-return devices, such as non-return valves.

To this end, the invention relates to a device for cleaning an immersed surface comprising:
- a hollow body and members for guiding and driving the body over the immersed surface in a main direction of advance, called the longitudinal direction,
- in the hollow body, a filtration chamber comprising:
- at least one liquid inlet located at the base of the hollow body in the region of a longitudinal end of the hollow body defining the front of the hollow body,
- at least one liquid outlet out of the hollow body,
- a hydraulic circuit which is capable of providing a flow of liquid between each inlet and each outlet through a filtering device, under the action of a pumping device, wherein the filtering device comprises at least one filtering casing which is mounted in the filtration chamber so as to be able to be removed as the device is resting on a horizontal surface in a position which corresponds to the cleaning position thereof when it is operating over an immersed surface, this filtering casing entirely constituting and delimiting the portion of the hydraulic circuit which is capable of conveying debris, called the unclean circuit, this filtering casing being able to be inserted into the filtration chamber in one piece and removed from this filtration chamber in one piece, this filtering casing having, when mounted in the filtration chamber, at least a lower end which opens at the base of the hollow body and which constitutes a liquid inlet into the hollow body of the device.

A device according to the invention allows a filtering casing to be disassembled when the device is resting on a horizontal surface, in a position which corresponds to the cleaning position thereof when it is operating over an immersed surface, that is to say, with the base of the hollow body opposite the horizontal surface. In this manner, the filtering casing may be removed from the device without it being inverted. This removal can be carried out via the front of the device, and/or via the rear of the device and/or via the top of the device.

Furthermore, the filtering casing comprises a lower end which opens at the base of the hollow body and which constitutes a liquid inlet. The inventors have established that it was possible to produce a filtering casing which cannot be removed via the base of the hollow body but which extends as far as the base of the hollow body so that this filtering casing forms a liquid inlet. In particular, this filtering casing forms an "unclean" portion of the hydraulic circuit of the device, that is to say, a portion of the hydraulic circuit which is capable of conveying debris. In all of the text below, this portion of the hydraulic circuit is called the unclean circuit. This unclean circuit can be disassembled in one piece.

Furthermore, the disassembly of this unclean circuit is a result of the disassembly of the filtering casing. A user can therefore readily remove the unclean circuit from the device in order to clean it when the device is resting on a horizontal surface. A user can therefore clean this unclean circuit which allows the initial performance levels to be restored to a device according to the invention. Furthermore, since the filtering casing forms a liquid inlet, it is easy with a device according to the invention to clean this liquid inlet, unblock it, for example, following blockage with a large piece of debris in the inlet, but without requiring the device be inverted. A device according to the invention affords the significant advantage of allowing at least one liquid inlet located at the base of the hollow body to be cleaned and disassembled without requiring the hollow body be accessed manually at the base and without requiring the device be inverted.

Since the filtering casing of a device according to the invention entirely constitutes the unclean circuit, a user is able to completely remove the entire unclean circuit from the device in one piece. Furthermore, since this unclean circuit is entirely delimited by the filtering casing, the user never comes into contact with an unclean portion of the device. In the same manner, no member of the device is in contact with a portion of the unclean circuit since it is entirely bypassed in the filtering casing. In this manner, the maintenance of the device can be carried out without the risk of the user, the device or the swimming pool becoming dirty in a completely clean environment. This is particularly the case since the filtering casing forms a chamber which delimits the unclean circuit and which is closed with respect to solid debris with the exception of each liquid inlet.

The inventors have further established that this specific arrangement at the same time allows the suction performance levels to be maintained, without increasing the vertical spatial requirement thereof, and therefore the hydraulic drag thereof, with a filtration device which is particularly efficient and which has a large storage space for debris and with no detrimental pressure loss.

Advantageously and according to the invention, each liquid inlet into the hollow body is formed by a lower end of a filtering casing which is removably mounted in the filtration chamber. Such a device therefore allows all of the unclean circuit to be readily disassembled, each liquid inlet into the device being formed by a lower end of a filtering casing. Each liquid inlet into the hollow body is thus cleaned owing to the simple disassembly of the corresponding filtering casing, without any need to invert the device.

Advantageously and according to the invention, the filtering device is constituted by a single filtering casing which is removably mounted in the filtration chamber. According to this variant, the device preferably comprises a single liquid inlet which is formed by the end of the single filtering casing and a single liquid outlet.

A filtering casing of a device according to the invention may have various shapes and sizes. Such a casing can be inserted into the filtration chamber and removed therefrom in one piece in order for it to be cleaned or replaced. To this end, such a casing may be formed by one or more components which are fitted together using any type of means. In particular, such a casing may be formed by one or more rigid, semi-rigid or flexible shells.

Advantageously and according to the invention, each filtering casing comprises:

a first shell which has peripheral filtering walls which extend towards the rear from a front opening of this first shell and which delimit, towards the rear, a space for recovering debris, the filtering walls being capable of retaining any debris conveyed by the liquid and allowing the flow of liquid from this first shell.

a second shell which is fitted to the first shell at the front thereof, these two shells and their relative assembly being adapted in such a manner that:

when the two shells are fitted together, the second shell closes the front opening of the first shell, with the exception of a liquid inlet passage which constitutes a liquid inlet opening into the debris recovery space, the cross-section of this inlet opening being smaller than that of the front opening of the first shell.

the two assembled shells can be moved relative to each other, after removing the filtering casing from the filtration chamber, by disengaging the front opening of the first shell which acts as an opening for emptying this first shell.

A device according to the invention, which comprises a filtering device of this type with two shells which are fitted together in such a manner that, when assembled, they form an integral filtering casing which can be readily removed from the device, is particularly practical to use. Such a filtering casing has a first shell which acts as a pocket for recovering debris and a second shell which acts as a liquid inlet conduit and partially blocks the debris recovery pocket so that, when the device is being operated over an immersed surface, the debris are received in the debris recovery pocket and are unable to be discharged via the liquid inlet. In this manner, when the filtering casing is removed from the hollow casing, the debris and dirt remain lodged in this pocket without any risk of being discharged via the liquid inlet, which ensures absolute respect for the cleanliness of the environment (device, user, pool . . . ).

Furthermore, the two shells are capable of being able to be disengaged from each other after the filtering casing has been removed from the device. Consequently, it is particularly convenient to clean the filtering device by separating the two shells from each other and removing the debris which are lodged in the debris recovery pocket. After the first shell has been cleaned, a user can fit the shells together and reinsert the filtering casing thus formed in the device.

Advantageously and according to the invention, the two shells are fitted together so as to be able to be disengaged from each other by means of simple handling without any tools.

For example, according to a variant of the invention, the shells are fitted together using reversible fitting means.

Advantageously and according to the invention, the front opening of the first shell extends over the periphery of a rear wall of the second shell and the inlet opening.

Advantageously and according to the invention, the two shells are fitted together along a connection zone which generally extends transversely and orthogonally relative to the longitudinal direction.

Advantageously and according to the invention, the second shell forms at least one liquid inlet conduit which extends from a lower end of this inlet conduit which opens at the base of the hollow body and which constitutes a liquid inlet.

Such an arrangement is particularly effective since the filtering casing formed in this manner comprises a lower end which opens at the base of the hollow body and which constitutes a liquid inlet. In this manner, this filtering casing forms the "unclean" portion, called the unclean circuit, of the hydraulic circuit of the device, that is to say, the portion of the hydraulic circuit which is capable of conveying debris. Since the filtering casing is removable, the unclean circuit can be integrally removed. A user is therefore able to clean or change all of the unclean circuit of the device and thus restore the initial performance levels to a device according to the invention.

Advantageously and according to the invention, the second shell has a rear transverse separation wall which extends transversely at the front of the debris recovery space, between a liquid inlet and the inlet opening provided at an upper end of the inlet conduit.

This transverse rear wall acts as a non-return wall in such a manner that the debris which have passed through this wall can no longer be discharged via the liquid inlet, including when the pumping device is idle, which eliminates the need to provide valves or other non-return devices at the liquid inlets.

The inventors have further found that the provision of this wall in the path of the liquid between each liquid inlet and each liquid outlet which at first may seem unfavorable with respect to the levels of hydraulic performance (flow, suction, . . . ) in practice allows the filtering performance levels to be improved owing to the generation of occurrences of turbulence within the filtering device in the unclean circuit, upstream of the filtering walls, which occurrences of turbulence permanently retain the debris in suspension in the filtering device, thus preventing the walls of the filtering device from becoming clogged, and finally promoting the hydrodynamic performance levels of the filtering device and the hydraulic circuit.

That is to say, the pressure losses brought about by the arrangement of a wall in the hydraulic path are compensated for by retaining the initial permeability of the filtering walls of the filtering device. Furthermore, the service periods between which the device must be cleaned are longer and in particular are of a substantially constant length of time, which leads to greater user comfort.

Advantageously and according to the invention, the first shell comprises a rigid frame which is capable of imposing a three-dimensional shape on these peripheral walls, and a filtering sheet which extends into openings which are provided by the rigid frame.

Advantageously and according to the invention, the first shell has a regular cross-section which decreases from the front towards the rear.

A filtering device whose regular cross-section decreases from the front towards the rear allows substantially tangential filtration of the liquid flowing in the filtering device. Such a principally tangential filtration limits clogging by obstructive debris (such as dead leaves) on the filtering walls of the device, which ensures good suction and good filtering, including after a long period of operation. Furthermore, it would appear that such a convergent shell also brings about a swirling flow of the liquid flowing in this pocket, which ensures continuous declogging of the walls of the pocket which has the effect of restoring the initial permeability to the various walls of the pocket.

Advantageously and according to the invention, the first shell has a horizontal upper wall which extends from the front opening and a lower rear wall which is inclined backwards and upwards from a base portion of the shell as far as an upper rear extreme portion.

Advantageously and according to the invention, at least one of the shells has a handle for handling the filtering casing.

Such a handle allows the filtering casing to be readily handled when the two shells are fitted together.

Advantageously and according to the invention, the access flap is provided on an upper wall of the hollow body.

Such a device is particularly practical to handle since removing the filtering device from the device does not involve complex operations of the device. In particular, it is not necessary to invert the device in order to remove the filtering device in order to clean it. Disassembling the filtering device can be carried out when the device is in the rest position, in its normal position, on a horizontal surface.

Advantageously, a device according to the invention does not have any liquid non-return valve.

Advantageously, a device according to the invention comprises at least one liquid outlet out of the hollow body which is called the rear outlet and which is offset towards the rear relative to the filtering casing.

Advantageously, a device according to the invention comprises a rear outlet which generates a flow of liquid which is orientated with a longitudinal component towards the rear.

These provisions allow the device to be configured so as to recover directly at least part of the residual hydraulic energy in the discharge flow in order to contribute to driving the device.

Consequently, with equivalent suction and cleaning performance levels, a device according to the invention may be provided with a pumping motor—in particular an electric pumping motor—and a driving device—comprising in particular at least one electric drive motor—whose power is reduced and which therefore involves lower consumption and costs. Consequently, the device is also generally smaller and lighter which, in addition to the savings made, is a significant advantage for the user, in particular in terms of handling, transport and storage of the device.

Advantageously, a device according to the invention comprises a motorized device for pumping liquid between each liquid inlet and each liquid outlet via the filtering casing.

The invention further relates to a device for cleaning an immersed surface, characterized in combination by all or some of the features mentioned above or below.

BRIEF DESCRIPTION OF THE DRAWINGS

Other features, objectives and advantages of the invention will be appreciated from a reading of the following description which sets out, by way of non-limiting example, an embodiment of the invention with reference to the appended drawings, in which.

DETAILED DESCRIPTION

Figure 1:
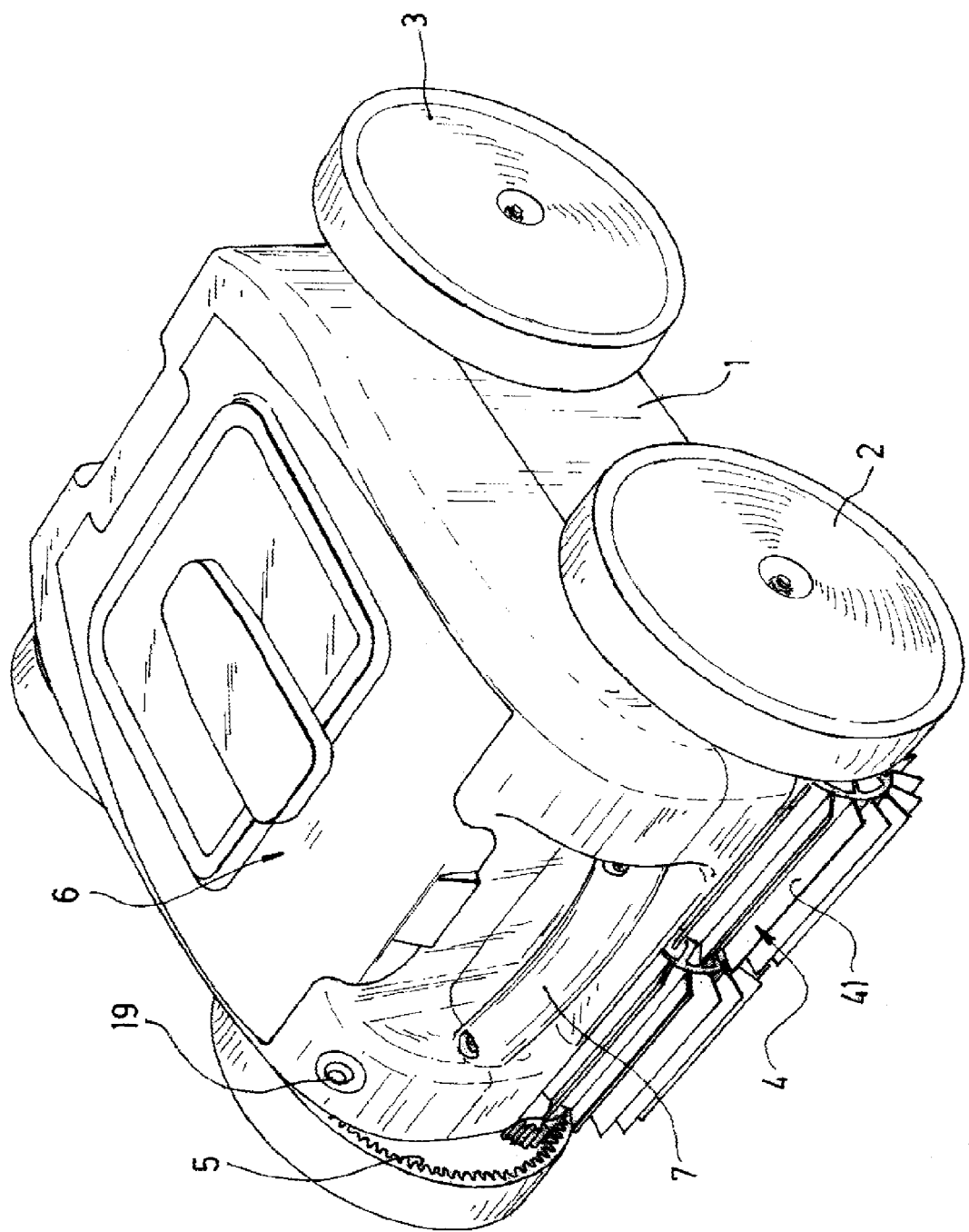
FIG. 1 is a schematic perspective view of a cleaning device according to an embodiment of the invention.

In the Figures, the scales and proportions are not strictly complied with for the purposes of illustration and clarity.

In all of the following detailed description with reference to the Figures, unless indicated otherwise, each component of the cleaning device is described as it is arranged when the device is moving normally over a horizontal immersed surface in a preferred direction of advance, relative to which the front and the rear are defined.

A device according to the invention comprises a hollow body 1 and rolling members 2, 3, 4 for guiding and driving the hollow body 1 over an immersed surface in at least one preferred direction of advance and in a main direction of advance, called the longitudinal direction, parallel with the immersed surface.

This hollow body 1 is formed principally by a concave housing Which delimits a central chamber 35. This concave housing is, for example, produced by means of molding or rotational molding. This housing is preferably produced from a thermoplastic material, such as polyethylene, polypropylene, ABS, PMMA or any equivalent material.

This hollow body 1 has a central chamber 35 which is capable of receiving a filtration chamber. This central chamber 35 is delimited by a lower wall which extends in a substantially horizontal plane; by lateral walls which generally extend in vertical planes; by a front wall which generally extends in a vertical plane, orthogonal relative to the planes of the vertical lateral walls; and by a rear wall which generally extends in a vertical plane orthogonal relative to the planes of the vertical lateral walls.

The lower wall has an opening which extends transversely in the region of the front wall so that liquid is able to enter the central chamber via this lower transverse opening. This opening forms a liquid inlet 9 into the hollow body 1.

The rear wall comprises a cylindrical opening which forms a liquid outlet 10 out of the hollow body 1. This liquid outlet 10 which is provided in the rear wall of the housing is longitudinally offset from the liquid inlet 9 which is provided in the lower wall. Furthermore, this liquid outlet 10 is provided in the upper portion of the housing in such a manner that it is also vertically offset from the liquid inlet 9.

Figure 2:
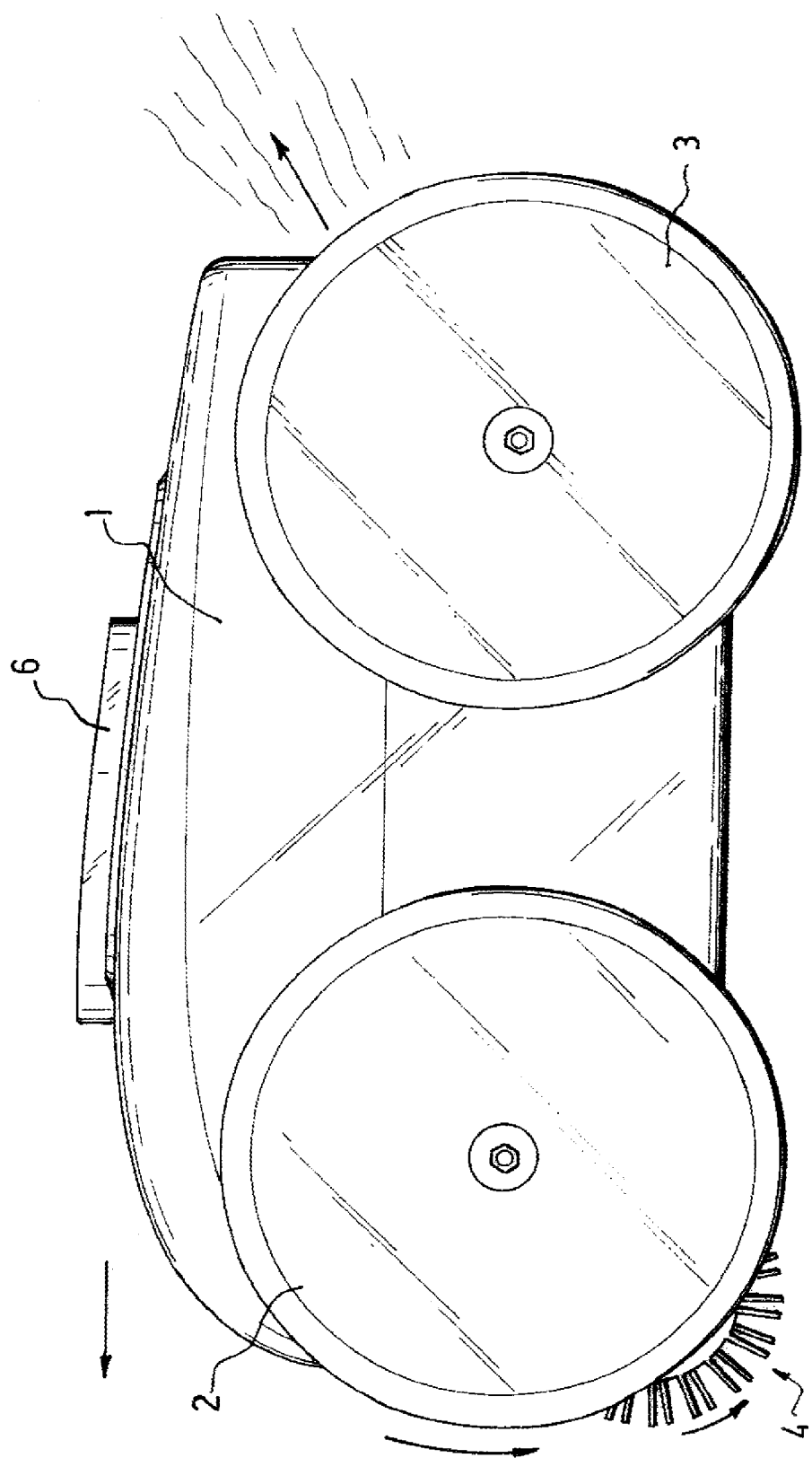
FIG. 2 is a schematic rear view of a cleaning device according to an embodiment of the invention.
Figure 3:
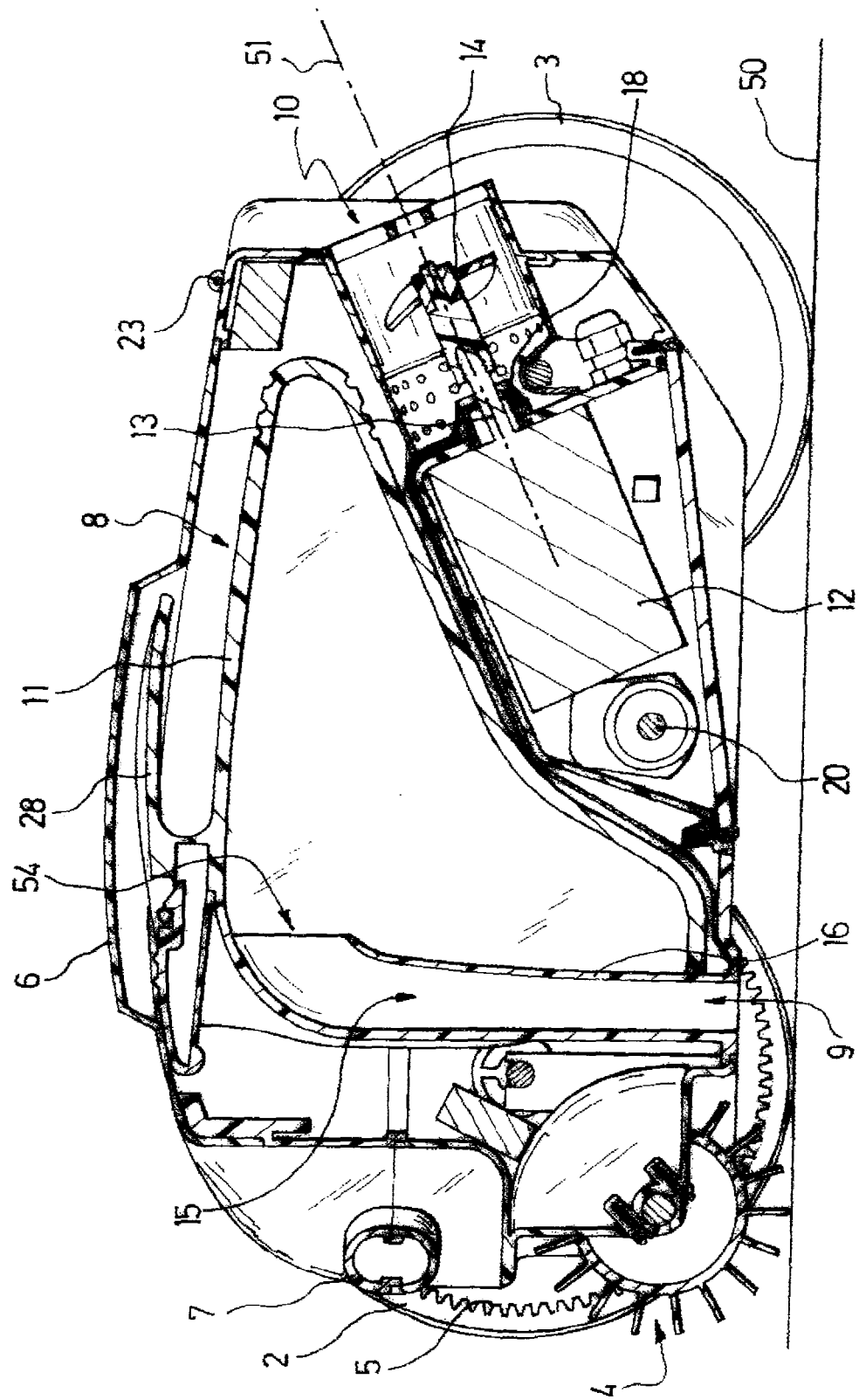
FIG. 3 is a schematic section of a cleaning device according to an embodiment of the invention.
Figure 4:
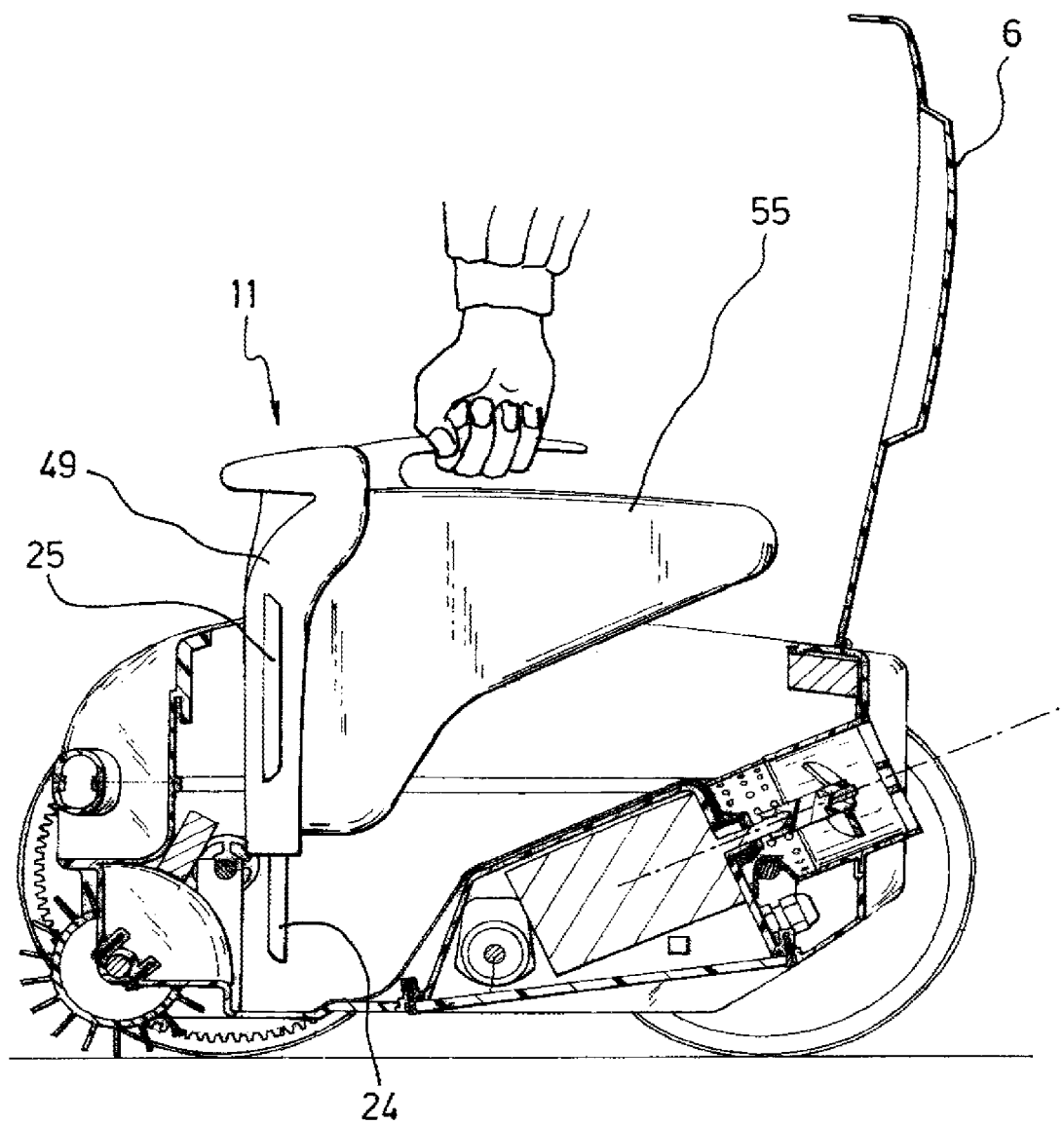
FIG. 4 is a schematic section of a cleaning device according to an embodiment with the filtering device being removed from the device.
Figure 5:
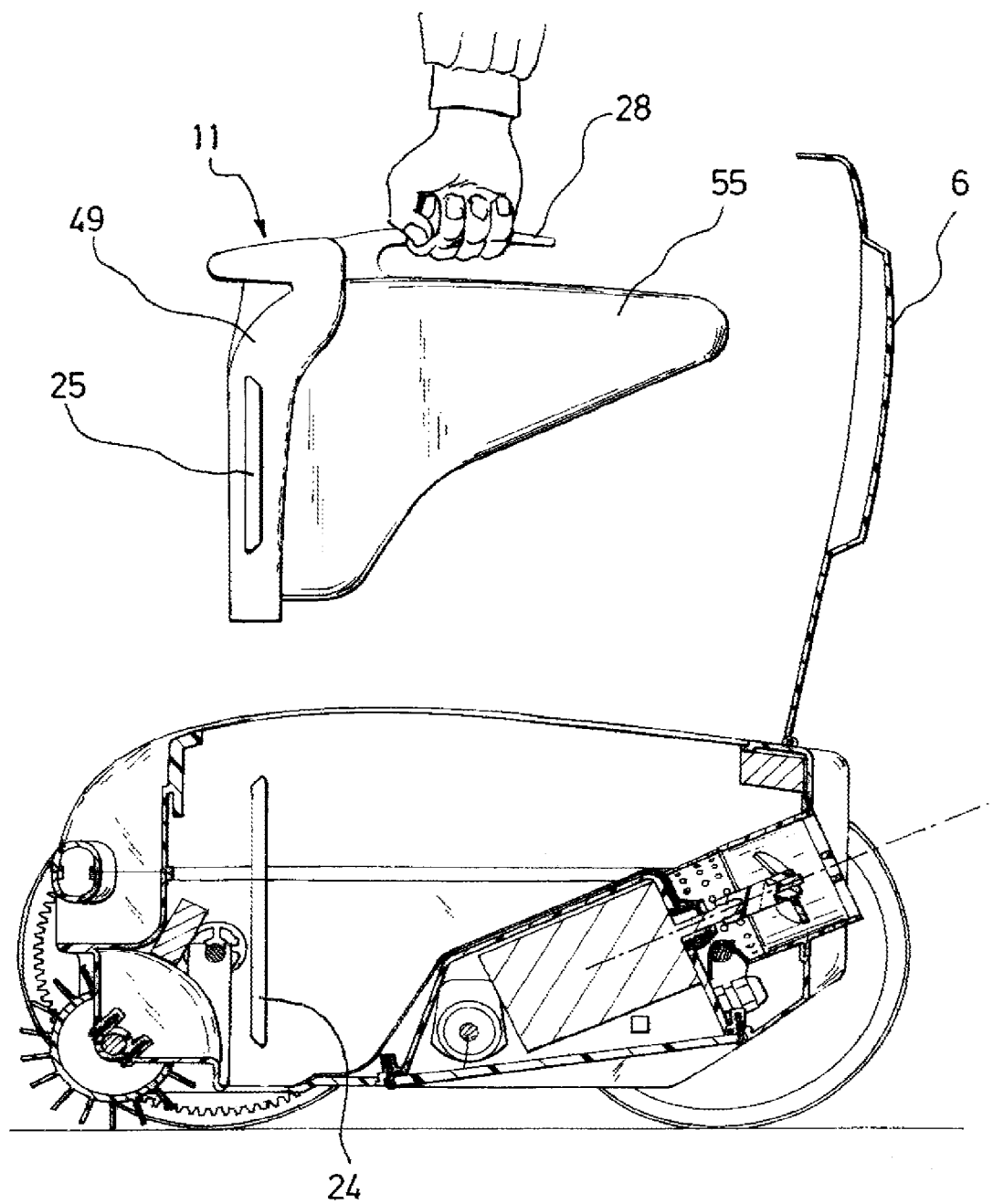
FIG. 5 is a schematic perspective view of the cleaning device according to FIG. 4.
Figure 6:
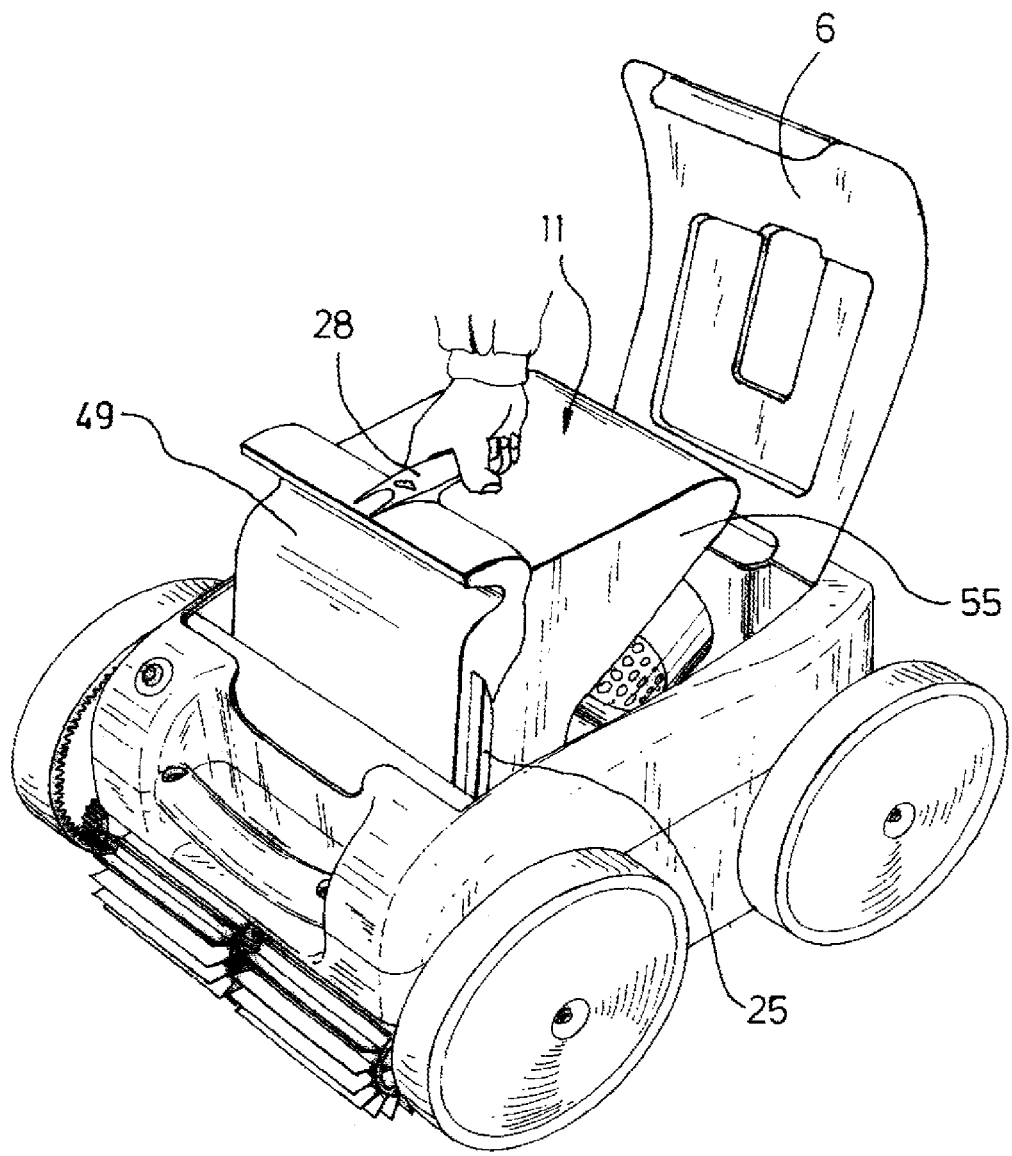
FIG. 6 is a schematic section of a cleaning device according to an embodiment whose filtering device is completely removed from the device.
Figure 7:
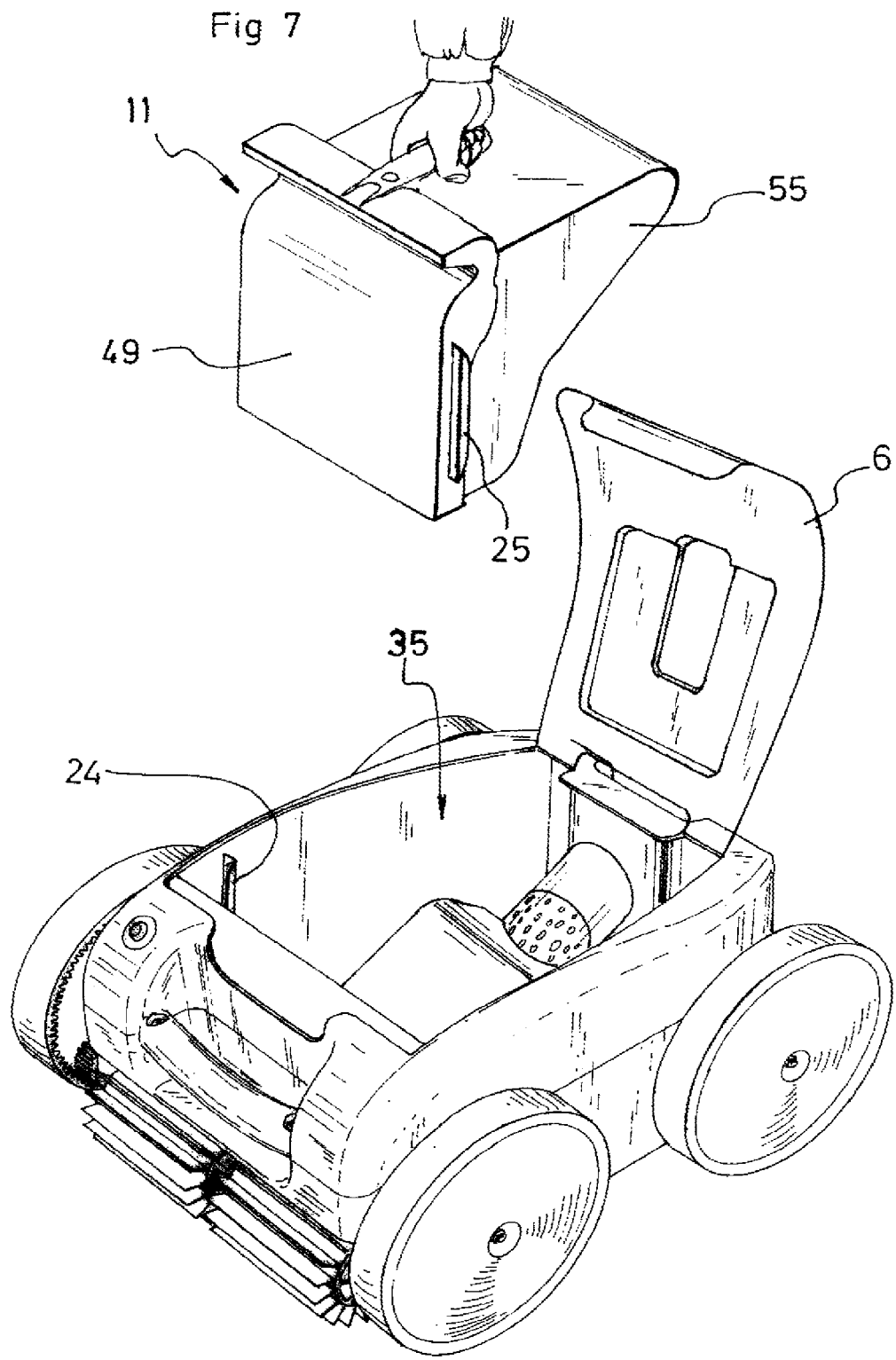
FIG. 7 is a schematic perspective view of the cleaning device according to FIG. 6.

As illustrated in particular in FIG. 2, this central chamber, this liquid inlet 9 and this liquid outlet 10 form a filtration chamber 8. This filtration chamber 8 further comprises a hydraulic circuit which is capable of providing a flow of liquid between the liquid inlet 9 and the liquid outlet 10 through a filtering device 11.

Preferably, the liquid inlet 9 and liquid outlet 10 are centered on the same longitudinal vertical center plane of the device.

The central chamber of the hollow body 1 is capable of receiving a filtering device 11. The filtering device 11 comprises two shells, a first shell 55 which forms a pocket for recovering debris and a second shell 49 which is capable of being fitted to the first shell 55 in order to form a filtering casing.

The debris recovery pocket formed by the first shell 55 of the filtering device 11 has peripheral filtering walls 56, 57, 58, 59 which extend towards the rear from a front opening 64. These filtering walls 56, 57, 58, 59 are capable of retaining any debris conveyed by the liquid and allowing liquid to flow out of this shell 55.

The second shell 49 forms a liquid inlet conduit 15 in the hollow body 1 which extends from a lower end of this inlet conduit 15 which opens at the base of the hollow body 1 and which constitutes a liquid inlet 9.

Figure 8:
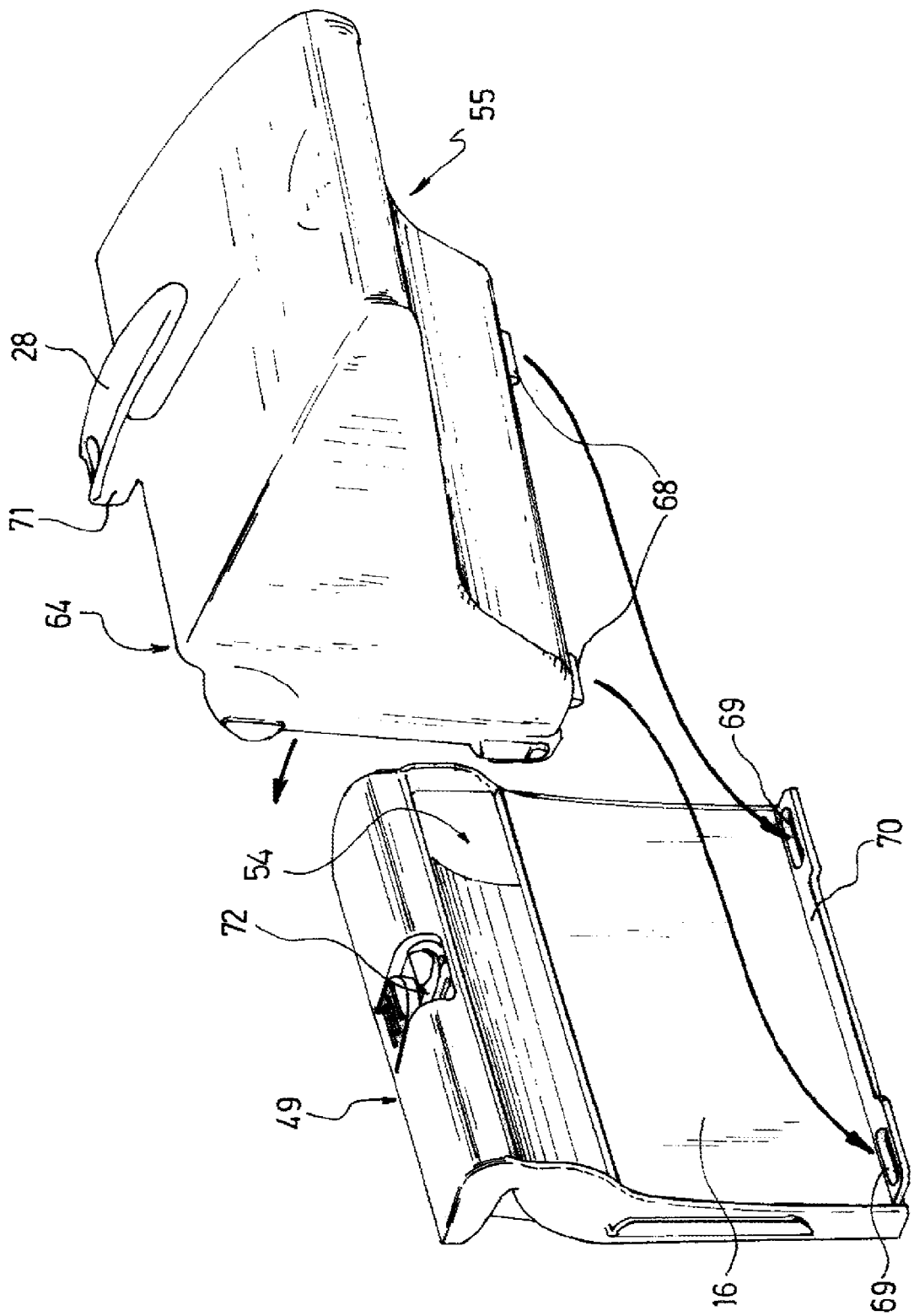
FIG. 8 is a schematic perspective view of the filtering device of a device according to an embodiment of the invention comprising two shells which are fitted to each other.
Figure 9:
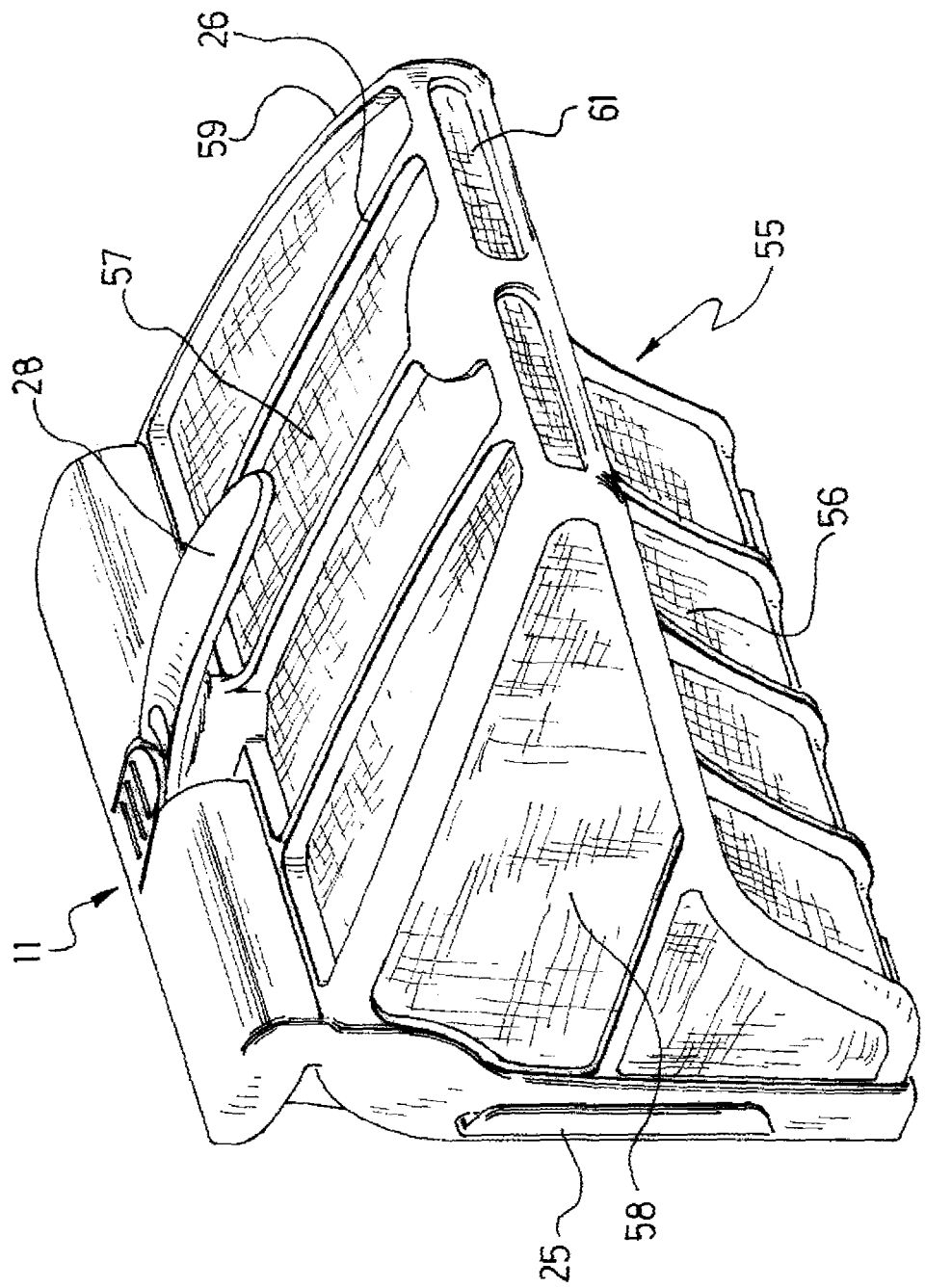
FIG. 9 is a schematic perspective view of the filtering device of FIG. 8 illustrating the two shells separated from each other.

The assembly between the first shell 55 and the second shell 49 can be produced using various means. For example, and as illustrated in FIG. 8, the first shell 55 comprises, in the region of the front lower end thereof, pins 68 which protrude from the plane of the opening 64 of the first shell 55. These pins 68 have shapes and dimensions which correspond to and complement the apertures 69 which are provided in tongues 70 which are fixedly joined to the rear lower end of the inlet conduit 15, and substantially perpendicular relative to the rear wall 16 of the conduit, so that these pins 68 can engage in the apertures 69 and allow a mechanical connection of the lower ends of the first shell 55 and the second shell 49. Furthermore, the first shell 55 has, in the region of the front upper end thereof, an element 71 which is capable of engaging in a catch 72 which is provided in the region of the upper end of the front wall of the conduit 15 in order to allow the assembly between the upper ends of the first shell 55 and the second shell 49. This element 71 protrudes relative to the plane of the opening 64 and has a strip which extends downwards and which is not illustrated in the Figures and which is capable of engaging in the catch 72.

The end of the catch 72 orientated towards the first shell 55 is further beveled in order to facilitate the insertion of the strip of the element 71 in the catch 72. Furthermore, this strip is flexible in terms of compression so that it can become slightly deformed in a downward direction during the engagement between the element 71 and this catch 72. This flexibility in terms of compression also allows a user to apply a downward pressure to the catch 72, for example, using his thumb, which allows the strip of the element 71 to be disengaged from the catch 72, thus bringing about a separation of the upper ends of the first shell 55 and the conduit 15. The assembly between the first shell 55 and the second shell 49 is produced by first fitting the lower ends to each other then by fitting the upper ends one inside the other. The shells are separated by first disengaging the upper ends from each other, then by disengaging the lower ends from each other. The assembly and the separation of the first shell 55 and the second shell 49 can therefore be readily carried out by a user without any tools.

This relative assembly between the first shell 55 and the second shell 49 is adapted so that, once assembled, the second shell 49 closes the front opening 64 of the first shell 55, with the exception of a liquid inlet passage which constitutes a liquid inlet opening 54 in the first shell 55, the cross-section of this inlet opening 54 being smaller than that of the front opening 64 of the first shell 55.

The first shell 55 is formed by a rigid frame 26 and a filtering sheet—in particular a filtering material—which extends into openings which are provided by this frame. The filtering device 11 is therefore self-supporting and can be readily handled by a user. Furthermore, this filtering device 11 forms a removable filtering casing whose lower end defined by the lower end of the inlet conduit 15 forms the liquid inlet 9 in the hollow body 1.

Furthermore, the first shell 55 has a regular cross-section which decreases from the front opening 64 towards the liquid outlet 10 in order to form a convergent chamber for tangential filtering of the liquid flowing between the opening 54 and the liquid outlet 10.

According to the embodiment of the Figures, the first shell 55 has a lower filtering wall 56 which is inclined backwards and upwards from a base portion of the first shell 55. This inclined lower wall 56 forms with the longitudinal direction an angle which, in the example illustrated, is in the order of 45°.

This first shell 55 further comprises a generally horizontal upper wall 57 which extends towards the rear from the front opening 64. This upper filtering wall 57 is connected to the lower filtering wall 56 by an upper rear extreme curved portion 61. The rear extreme curved portion 61 has a minimal regular cross-section whilst the portion of the first shell 55 opposite this curved portion 61, that is to say, in the region of the front opening 64, has a maximum regular cross-section. In this manner, the first shell 55 has a regular cross-section which decreases from the front opening 64 towards the rear extreme curved portion 61, that is to say, towards the rear outlet 10.

That is to say, the first shell 55 has a regular cross-section which is in the form of a rectangular triangle, the inclined lower wall 56 forming the hypotenuse.

The device also comprises a flap 6 for access to this filtering device. This access flap 6 forms an upper wall of the hollow body 1 and covers it. In the embodiment illustrated, this flap 6 is arranged on the upper portion of the device so that a person using the device can readily open the flap 6 and remove the filtering device 11. Preferably, the access flap 6 is articulated to the body 1 of the device by means of hinges 23 which are provided at the rear of the device.

Preferably, the filtering device 11 is a device which is mounted in the central chamber 35 of the hollow body 1 in the manner of a drawer. To this end, the rigid frame 26 of the filtering device 11 further has two ribs 25 which extend laterally at each side of the filtering device 11. These ribs are preferably provided on the lateral walls of the inlet conduit 15 since this conduit has no filtering walls. However, according to other embodiments, they could be provided on the lateral walls of the filtering walls, for example, on the frame 26 of the first shell 55. Regardless of their position, these ribs 25 have shapes and dimensions which correspond to and complement the shapes and dimensions of grooves 24 which are fixedly joined to the hollow body 1. These grooves 24 which are fixedly joined to the hollow body 1 extend vertically along the inner faces of the vertical lateral walls of the hollow body 1. The ribs 25 of the filtering device 11 are therefore capable of co-operating with the grooves 24 of the hollow body 1 of the device.

In this manner, the removal of the filtering device 11, as illustrated in the assembled state in FIG. 8, is the result of a translation movement of the filtering device 11 along the grooves 24 of the hollow body 1. A user can therefore readily remove the filtering device 11 from the hollow body 1, for example, in order to clean it. After the filtering device 11 has been removed, a user, as indicated above, can readily separate the two shells which form this device. This user can therefore clean the first shell 55 which acts as the debris recovery pocket and the inlet conduit 15 and the liquid inlet 9 which is arranged at the lower end of the inlet conduit 15. After the first shell 55 which forms the debris recovery pocket and the second shell 49 which forms the inlet conduit have been cleaned, the user can readily assemble this first shell 55 and this second shell 49 as indicated above and easily reintroduce the filtering device 11 in one piece into the hollow body 1 by orientating the filtering device 11 so that the ribs 25 of the filtering device 11 are opposite the grooves 24 of the hollow body, then by sliding the filtering device 11 in the hollow body 1.

The filtering device 11 further comprises a handle 28 which is provided on an upper portion of the filtering device 11 in order to facilitate handling of the filtering device 11. In particular, a user is able to readily assemble/disassemble the filtering device 11 using this handle 28 when the device is out of the liquid and resting on a horizontal surface. According to a particularly advantageous embodiment, the handle 28 is the continuation of the rear portion of the sliding bolt 71 to which a user can apply pressure in order to release the sliding bolt 71 from the catch 72 which is provided in the inlet conduit 15 as mentioned above.

According to the invention, a device comprises a motorized liquid pumping device which comprises an electric pumping motor 12 which has a rotating drive shaft 13 which is coupled to a pumping propeller 14 which is interposed in the hydraulic circuit in order to generate therein a liquid flow between the liquid inlet 9 and the liquid outlet 10. The liquid outlet 10 is directly opposite the pumping propeller so that the liquid flows out of the liquid outlet 10 in a direction which corresponds to the liquid flow generated by the pumping propeller, this flow having a speed which is orientated in accordance with the rotation axis 51 of the propeller 14.

The pumping propeller 14 has an orientation which allows a flow of liquid to be generated with a horizontal component towards the rear.

Preferably, the pumping propeller 14 which is interposed in the hydraulic circuit between the liquid inlet 9 and liquid outlet 10 has an inclined rotation axis which forms, with the longitudinal direction and with the theoretical rolling plane 50, an angle $\alpha$ which is not equal to 90°. This propeller 14 is rotated by means of the electric pumping motor 12 which preferably has a rotating drive shaft 13 which is parallel with the rotation axis of the propeller 14.

According to the invention, the electric pumping motor 12 is arranged below the hydraulic circuit entirely at the outer side of this hydraulic circuit which completely bypasses the pumping motor 12 at the top. The rotating shaft 13 of the pumping motor 12 extends through a lower inclined wall 30 which delimits the hydraulic circuit. The sealing is provided by an O-ring 18.

Figure 10:
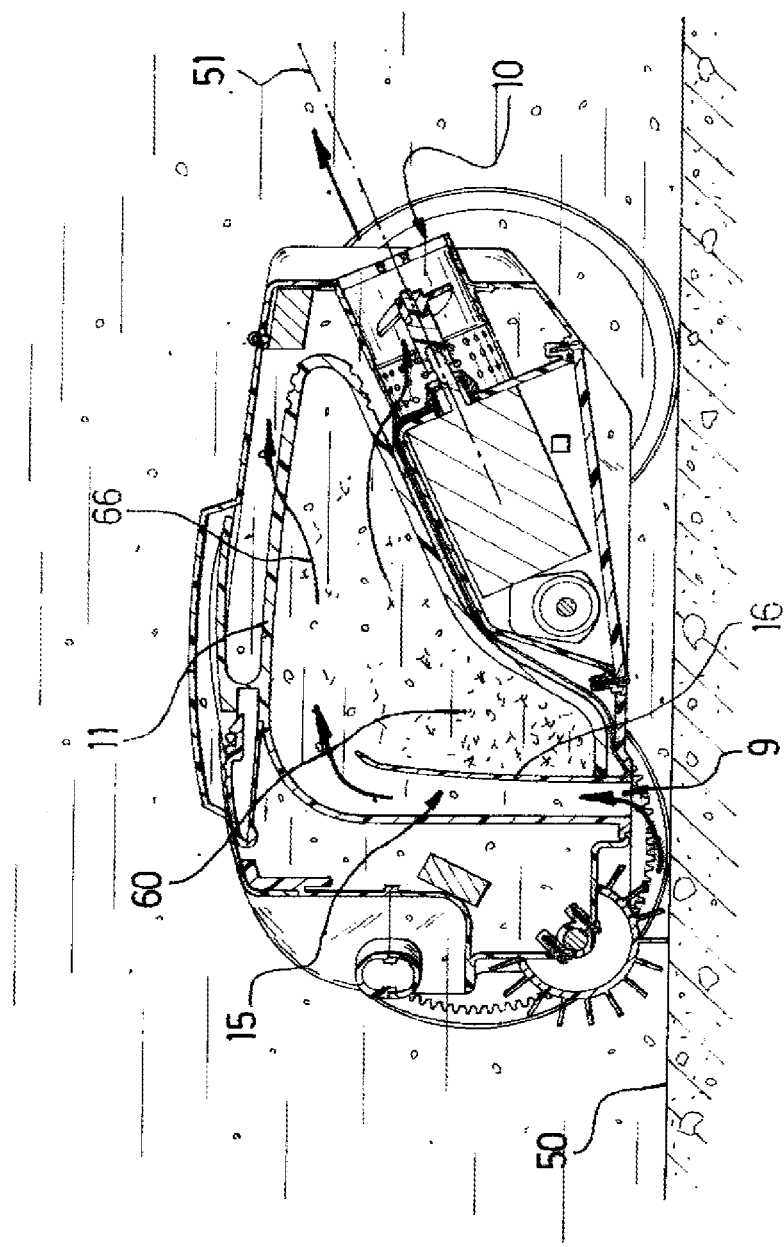
FIG. 10 is a simplified schematic section of FIG. 3 illustrating the device operating over an immersed surface.

FIG. 10 comprises an illustration of the flow of liquid in the hollow body 1 of the device. This flow is illustrated schematically in FIG. 10 by means of the arrows 66. Liquid enters the hollow body 1 via the liquid inlet 9 which is arranged below the device. This liquid passes into the liquid inlet conduit 15 in order to reach the first shell 55 which forms the debris recovery pocket. This debris recovery pocket allows the liquid to pass through the filtering material and retains the solid debris 60. The filtered liquid reaches the liquid outlet 10 and is discharged at the rear of the device into the pool from which it originates.

Since the liquid outlet 10 is opposite the pumping propeller 14, the liquid flows out of the device via this outlet with a speed V which is orientated along the axis 51 of the pumping propeller 14 and which has a longitudinal component towards the rear which brings about, by means of reaction, forces whose resultant has a longitudinal drive component which is orientated towards the front and which is involved in driving the device over the immersed surface.

The orientation of the hydraulic reaction force produced by this outlet flow and therefore the size of the longitudinal component thereof are dependent on the inclination a relative to the theoretical rolling plane 50, the rotation axis 51 of the propeller and the liquid outlet 10. Preferably, this inclination a is between 15° and 45°.

According to the invention, the electric pumping motor is arranged below the hydraulic circuit entirely at the outer side of this hydraulic circuit so that the filtering device 11 of the hydraulic circuit can be removed from the device via the top of the device as mentioned above, without being impeded by the pumping motor. Only the pumping propeller 14 is arranged in the hydraulic circuit so as to be able to provide the liquid flow. This pumping propeller 14 is arranged at the rear of the device, close to the liquid outlet 10. That is to say, the pumping propeller 14 and the liquid outlet 10 form the end portion of the hydraulic circuit.

In the preferred embodiment of the invention illustrated in the Figures, the rolling members for guiding and driving the device comprise a front axle which comprises front drive wheels 2, one at each side, and a rear axle which comprises rear non-drive wheels 3, one at each side.

Furthermore, preferably and as illustrated in the Figures, the device comprises brushes 4 which are arranged at the front of the device. These brushes 4 are intended to brush the immersed surface and move the debris which are brushed towards the rear of the device in the direction of the liquid inlet 9 which is arranged below the device.

The device further comprises at least one electric motor 20 for driving the front drive wheels 2. Preferably, the device comprises two drive motors, one at each side, for independently driving each of the front wheels 2, respectively. To this end, each front wheel 2 has an internal toothed arrangement 5 which co-operates with a pinion which is driven by the corresponding drive motor 20.

These brushes 4 may be of any type. According to an embodiment of the invention, the device comprises two front coaxial brushes 4. Each brush 4 is capable of being rotated about an axis which extends in a direction perpendicular relative to the longitudinal direction. Each brush 4 comprises a plurality of fins 41 which extend radially from a brush shaft which forms the rotation axis of the brush 4. The fins 41 are, for example, of rubber or a strong plastics material.

Furthermore, the brushes 4 are preferably also rotated by at least one electric motor 20 for driving the front wheels 2 by means of a gear system.

In this manner, in the embodiment illustrated, the rolling members are constituted by the front drive wheels 2, rear non-drive wheels 3 and brushes 4 which are involved in driving and guiding the device over the immersed surface. In any case, the rolling members 2, 3, 4 have zones which are intended to come into contact with the immersed surface and which are coplanar and define a theoretical rolling plane 50. The longitudinal direction of advance of the device is parallel with this theoretical rolling plane 50.

The front wheels 2 preferably have a diameter of between 100 mm and 500 mm, in particular between 150 mm and 250 mm. According to the embodiment of the Figures, the front wheels 2 have a diameter in the order of 200 mm. In this manner, the front wheels 2 make it easier to overcome obstacles and have improved traction. Advantageously, their peripheral tread is formed by or covered with an anti-skid material.

The front wheels 2 and the brushes 4 constitute front drive rolling members 2, 4 which protrude forwards relative to the other constituent elements of the device, in particular the hollow body, in order to form the extreme front portion of the device and first come into contact with an obstacle which is encountered during the forward movement.

The electric drive motor and the electric pumping motor may be of any known type. According to a preferred embodiment, these electric motors are low-voltage motors. They can be supplied with electrical power via an electrical power supply external to the device via an electrical cable which is not illustrated in the Figures and which is connected to the device in the region of a zone 19 for introducing the electrical cable into the device, as illustrated in FIG. 1.

Furthermore, according to a preferred embodiment of the invention, the device also comprises an operating handle 7 which allows a user to carry the device in order to immerse it in a liquid and remove it therefrom. This handle 7 is preferably arranged opposite the liquid outlet 10 so that, when the hollow body 1 is suspended via this handle, the device tilts spontaneously under the effect of gravity into a position in which the liquid outlet 10 is located below the liquid inlet 9 which allows the device to be emptied. When the device moves from the cleaning position to the emptying position, the debris drawn in by the device are retained in the filtering device and cannot be discharged from the device.

Of course, the invention may involve numerous construction variants and applications.

For example, according to an embodiment which is not illustrated in the Figures, the filtering device 11 may form more than one liquid inlet. In the same manner, the filtering casing may be formed from a single disposable component.

Furthermore, the sizing and the configuration of the device, in particular the hydraulic circuit thereof, are subject to an infinite number of variants. In addition, the invention can be used for a bi-directional device which is capable of backward movement.

The invention claimed is:

1. A swimming pool cleaner comprising:
   a. a body (i) defining a water inlet and a water outlet and (ii) configured for movement within a swimming pool; and
   b. a debris filter defining a debris recovery space and comprising:
      i. a transverse separation wall configured to prevent debris entering the debris recovery space from exiting the water inlet when the swimming pool cleaner is in use;

ii. an upper filtering wall;
iii. an inclined lower filtering wall;
iv. a rear extreme curved portion connecting the upper filtering wall and the inclined lower filtering wall; and
v. first and second lateral walls connecting the upper filtering wall and the inclined lower filtering wall.

2. A swimming pool cleaner comprising;
a. a body (i) defining a water inlet and a water outlet and (ii) configured for movement within a swimming pool;
b. a pumping propeller positioned at least partially within the body; and
c. a debris filter defining a debris recovery space and comprising:
   i. a transverse separation wall configured to prevent debris entering the debris recovery space from exiting the water inlet when the swimming pool cleaner is in use;
   ii. an upper filtering wall;
   iii. an inclined lower filtering wall;
   iv. a rear extreme curved portion connecting the upper filtering wall and the inclined lower filtering wall; and
   v. first and second lateral walls connecting the upper filtering wall and the inclined lower filtering wall; and
in which (a) the transverse separation wall is immobile relative to the body when the pumping propeller is operating and (b) the body lacks any water non-return valve.

3. A swimming pool cleaner comprising:
a. a body (i) defining a water inlet and a water outlet and (ii) configured for movement within a swimming pool; and
b. a debris filter defining debris recovery space and comprising:
   i. a transverse separation wall configured to prevent debris entering the debris recovery space from exiting the water inlet when the swimming pool cleaner is in use;
   ii. an upper filtering wall;
   iii. an inclined lower filtering wall;
   iv. a rear extreme curved portion connecting the upper filtering wall and the inclined lower filtering wall; and
   v. first and second lateral walls connecting the upper filtering wall and the inclined lower filtering wall; and
in which (a) the transverse separation wall forms part of a second shell and (b) the upper filtering wall, inclined lower filtering wall, rear extreme curved portion, and first and second lateral walls form at least part of a first shell configured to attachment to the second shell, the first and second shells being completely separable to expose the debris recovery space.

4. A swimming pool cleaner according to claim 3 in which the second shell forms a liquid inlet conduit bounded at least in part by the transverse separation wall.

5. A swimming pool cleaner according to claim 4 in which the first shell (a) further includes a front opening and (b) has a regular cross-section which decreases in size from the front opening toward the rear extreme curved portion.

6. A swimming pool cleaner according to claim 5 in which the regular cross-section of the first shell is generally in the form of a rectangular triangle whose hypotenuse is formed by the inclined lower filtering wall.

7. A swimming pool cleaner according to claim 6 in which (a) the debris filter is positioned within the body in use and (b) the upper filtering wall is generally horizontal when the body is upright and the debris filter is positioned within the body.

8. A swimming pool cleaner according to claim 7 in which the transverse separation wall is generally vertical when the body is upright and the debris filter is positioned within the body.

9. A swimming pool cleaner according to claim 8 in which, when the first and second shells are attached, the second shell closes at least part of the front opening of the first shell.

* * * * *